(No Model.)

O. CASSITY.
VEHICLE SPRING.

No. 375,603. Patented Dec. 27, 1887.

Witnesses
E. L. Taylor
J. W. Garner

Inventor
Oliver Cassity

By his Attorneys,
C. A. Lowsler

UNITED STATES PATENT OFFICE.

OLIVER CASSITY, OF WHITE LICK, INDIANA.

VEHICLE-SPRING.

SPECIFICATION forming part of Letters Patent No. 375,603, dated December 27, 1887.

Application filed March 22, 1887. Serial No. 231,976. (No model.)

*To all whom it may concern:*

Be it known that I, OLIVER CASSITY, a citizen of the United States, residing at White Lick, in the county of Boone and State of Indiana, have invented a new and useful Improvement in Vehicle-Springs, of which the following is a specification.

My invention relates to an improvement in vehicle-springs; and it consists in the peculiar construction and combination of devices that will be more fully set forth hereinafter, and particularly pointed out in the claim.

Figure 1:
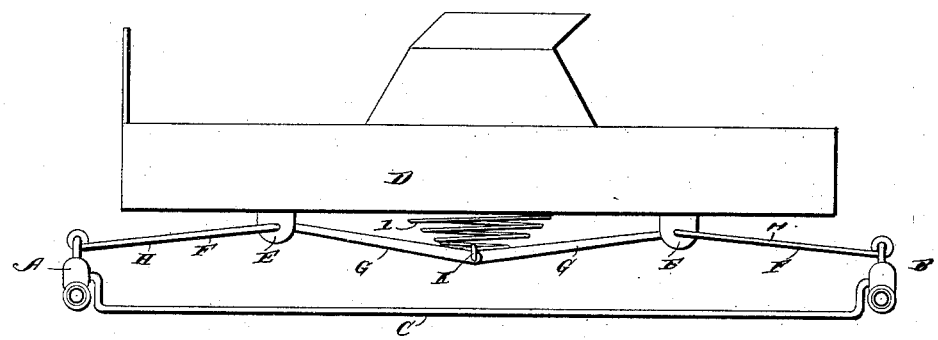
Figure 2:
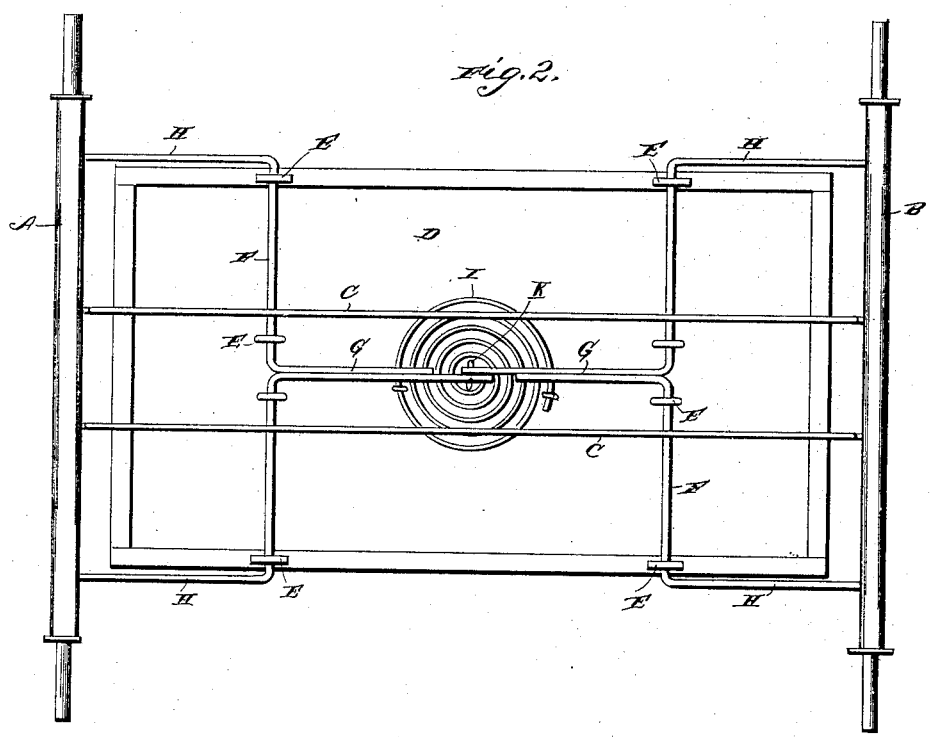

In the drawings, Figure 1 is a side elevation of parts of a vehicle provided with a spring embodying my improvement. Fig. 2 is a bottom plan view of the same.

A represents the bolster on the upper side of the front axle.

B represents the rear axle, and C represents the reaches, connecting the bolster to the rear axle.

D represents the body or platform of the vehicle, which is provided on its under side, at a suitable distance from its front and rear ends, with bearing-blocks E, in which are journaled a pair of transverse rock-shafts F. From the centers of the said rock-shafts project inwardly-extending arms G, which approach each other, and from the ends of the said rock-shafts project outwardly-extending arms H, the extremities of which are pivotally connected to the bolster and to the rear axle, as shown in Fig. 1.

I represents a volute spring, which is secured under the bed or platform, at the center thereof; and the central portion or inner end of the said spring is connected to the ends of the inwardly-extending arms G by means of links K. The volute spring bears normally against the lower side of the bed or platform, and has its coils arranged in the same horizontal plane, thus drawing the inner ends of the arms G upward and thereby raising the bed or platform above the running-gear of the vehicle, as will be very readily understood, and as shown in Fig. 1.

Weight applied to the body or platform causes the rock-shaft to partly turn, and thereby the inner ends of the arms G are lowered against the tension of the spring I.

From the foregoing description, and by reference to the accompanying drawings, it will be readily understood that the springs and the rock-shafts provided with the arms or levers, permit the body or platform to move only in a vertical direction, but not sidewise or endwise, thus making the vehicle ride very easily and preventing the body and the top from being racked and jerked to pieces by side strain.

Having thus described my invention, I claim—

In a vehicle, the combination of the body or platform, the transverse rock-shafts journaled thereto and having the outwardly-extending arms H, pivotally connected to the running-gear, the inwardly-extending arms G, approaching each other, and the volute spring secured under the platform or body and connected to the free inner ends of the arms G, for the purpose set forth, substantially as described.

In testimony that I claim the foregoing as my own I have hereto affixed my signature in presence of two witnesses.

OLIVER CASSITY.

Witnesses:
 JOHN S. MCDANIEL,
 THOMAS A. CASSITY.